United States Patent [19]

Bursteinas et al.

[11] Patent Number: 5,484,044
[45] Date of Patent: Jan. 16, 1996

[54] DEVICE FOR THE AUTOMATIC CONTROL OF VEHICULAR BRAKE SYSTEMS ON HILLS

[75] Inventors: Orlando Bursteinas; Sabstião; A. Machado, both of Santos; Umberto J. Fontes, Rio de Janeiro, all of Brazil

[73] Assignee: Mário Sérgio Helmeister, São Paulo, Brazil; a part interest

[21] Appl. No.: 335,574

[22] Filed: Nov. 7, 1994

[51] Int. Cl.$^6$ .................................................. B60T 11/00
[52] U.S. Cl. ...................... 188/353; 188/181 T; 303/24.1
[58] Field of Search ........................ 303/24.1, 89, 192, 303/191; 188/353, 111 E, 265, 181 T; 180/282, 290

[56] References Cited

U.S. PATENT DOCUMENTS

| | | | |
|---|---|---|---|
| 4,666,021 | 5/1987 | Messersmith | 188/181 T X |
| 4,717,207 | 1/1988 | Kubota et al. | 188/353 X |

FOREIGN PATENT DOCUMENTS 0055248  3/1987  Japan ..................................... 188/353

Primary Examiner—Robert J. Oberleitner
Assistant Examiner—Peter M. Poon
Attorney, Agent, or Firm—Darby & Darby

[57] ABSTRACT

A device for the automatic control of vehicular brake systems on hills, in order to allow the vehicle to remain stopped on a hill even after the brake pedal of the vehicle has been released. The device automatically releases the brakes when the driving torque produced by the engine against the wheel braking elements is equal to, or greater than, the opposite braking torque resulting from the slope of the hill. An electromechanical control valve is mounted to the brake system of the vehicle, in order to allow or block the release of the braking fluid pressure applied to the wheel braking elements upon the activation of the valve by a control unit, which receives information about the applied driving torque from a load sensor mounted to the braking elements of at least one wheel of the vehicle.

26 Claims, 4 Drawing Sheets

DEVICE FOR THE AUTOMATIC CONTROL OF VEHICULAR BRAKE SYSTEMS ON HILLS

This invention refers to a device to be provided for the braking system of a motor vehicle, in order to impart a hill hold capability to said braking system and to allow the brakes to be automatically released at a right moment when a certain amount of driving torque is applied to the vehicle wheels.

The conventional braking systems act to reduce the speed of the vehicle until it is stopped, and maintain it stopped, as long as the brake pedal is pressed by the driver or the hand brake is engaged. The vehicle is allowed to move when the pressure on the brake pedal is released and when the hand brake disengaged. As a consequence, some difficulties occur when the vehicle is temporarily stopped on a hill. These difficulties result from the need of using the hand brake, or the brake pedal witch the "heel and toe", to start the vehicle again, without letting it move downhill. These operations require from the driver a certain amount of dexterity, and present the risk of collision with another vehicle or object, if not executed properly. There is also the risk of damage to the transmission parts, principally in heavy vehicles. It is almost impossible to carry out this operation without forcing the transmission, or "jerking" the vehicle, as it is quite impossible to determine the exact moment to release the brakes.

Braking systems having a hill hold capability are well known. Some of said systems use sensors to determine the desired "right moment" in which the brakes should be released upon the application of driving torque to the wheels of the vehicle.

Some constructive solutions for those systems use a sensor, mounted on the suspension of the vehicle or between the suspension and the chassis, in order to detect deformation on some parts of the suspension, when the vehicle is subjected to a driving torque on a hill. Said sensors can take the form of deformable elements carried by a suspension arm or contact switches, to sense suspension strut tilt and thus the torque applied.

Although said sensors can be in fact used to define the time in which the brakes should be kept actuated after the vehicle is stopped on a hill or released upon a certain application of driving torque to the vehicle wheels, they present some drawbacks, since the "right moment" for the liberation of the brake system will depend on the behavior of a suspension element of the vehicle, said behavior being affected, in turn, by the incline of the hill and the load that is being carried by the vehicle.

In another constructive solution, the sensor takes the form of a contact switch, mounted adjacent to the braking elements of the vehicle, in order to detect a certain degree of displacement of said braking elements when a certain driving torque is applied to the wheels in opposition to the actuating parking torque.

Although said known construction does not depend on the deformation of the vehicle suspension, it requires that the braking elements have a relatively great displacement between opposite stops, in order to operate the switch and change the condition from blocked brakes to a running or rest condition or vice-versa. This is necessary because switches need relatively great displacement to change the condition from "on" to "off" or "off" to "on".

One problem of said prior system results from the fact that the brake elements need to be displaceable between two opposite positions, in order to activate the switch means with said movement, which can be rather strong when the brakes are applied by the driver in a normal running condition of the vehicle. Another problem results from the fact that the displacement necessary to change the switch condition is greater than the normal permitted displacement of the braking elements. In this way, the braking elements of the other wheels reach their steps before the occurrence of switch change, the brakes remaining blocked even after the drive force has reached a value higher than the downhill force, a wheel spinning being necessary where the sensor is installed before releasing the brakes. The general object of the present invention is to provide a device to be mounted on a vehicular brake system, in order to impart to said brake system, through a simple and reliable constructive solution, an effective hill hold capability.

It is a more specific object of the invention to provide a control device as cited above, which can impart a hill hold capability to the vehicular brake system, by sensing the relative amount of the parking torque and the driving torque, which are applied to the wheel braking elements of a vehicle stopped on a hill, through the detection of the elastic deformation of a sensor mounted to said wheel braking elements, said sensor acting as a lead sensor, precisely detecting the exact moment that the brakes can be released.

According to the present invention, the control device is used in combination with a vehicular brake system and comprise:

an electromechanical control valve, mounted to the brake system, in order to selectively allow and block the release of the braking fluid pressure applied to the wheel braking elements;

at least one lead sensor, operatively connected to the wheel braking elements, in order to be elastically deformed in two opposite directions from a rest condition, when the wheel braking elements are applying to said wheel a braking torque lower than a certain minimum value and between two opposite end deformed conditions, when the wheel braking elements are applying to said wheel a braking torque at least equal to said minimum value, said load sensor varying its electrical resistance upon said elastic deformation;

first voltage comparator means, having a first and a second inlet connected to an electrical power source of the vehicle, at least one of said inlets being connected to the electrical power source through at least one load sensor, said first voltage comparator means having all outlet, delivering a predetermined output voltage when the load sensor is in the rest condition and a different output voltage when the load sensor is elastically deformed towards any of its opposite end deformed conditions;

first amplifier means, connected to the outlet of the first voltage comparator means in order to amplify the output voltage therefrom;

a control unit, receiving the amplified output voltage from the first amplifier means and a reference voltage from the electrical power source, said reference voltage being equal to said predetermined amplified output voltage from first amplifier means, said control unit having: second voltage comparator means provided with a first inlet, a second inlet and an outlet which can deliver an output voltage when the voltage applied in the first inlet is greater than the voltage applied to the second inlet; and first switching means to selectively apply the output voltage from the first amplifier means to the first and second inlets of the second voltage comparator means, while applying the reference voltage to the other of said first and second inlets of the second voltage comparator means;

a direction sensor assembly having switches, each one being associated with a respective gear shift lever position defined at least by the forward and rear gear positions and connecting the electrical power source to the first switching means of the control unit when the respective gear is engaged, said electrical connection of the first switching means with the electrical power source defining the inlet of the second comparator means to which the output voltage of the first amplifier means is to be applied, in order to provide an output voltage from the second voltage comparator means when the wheel braking elements are applying said minimum braking torque to the wheel in a direction opposite to the direction of the driving torque and of the gear selected by the gear shift lever;

second amplifier means, having an inlet connected between the outlet of the second voltage comparator means and an outlet connected to the electromagnetic control valve, in order to amplify the output voltage of the second voltage comparator means to a value sufficient to close said control valve.

The object of this invention permits the vehicle to remain stopped on a hill, even after the brake pedal, the hand brake and any other existing braking system of the vehicle have been released. When this happens, the vehicle can be moved, as the device automatically releases the brakes when the driving torque produced by the engine on the brakes is equal to, or greater than, the opposite braking torque resulting from the slope of the hill. In this manner, it is possible to execute maneuvers on hills, without the risk of the vehicle going downhill.

The invention will be described now, by way of example, with reference to the attached drawings, in which:

FIG. 1 schematically illustrates a brake system, including the control device of the present invention;

Figure 1:
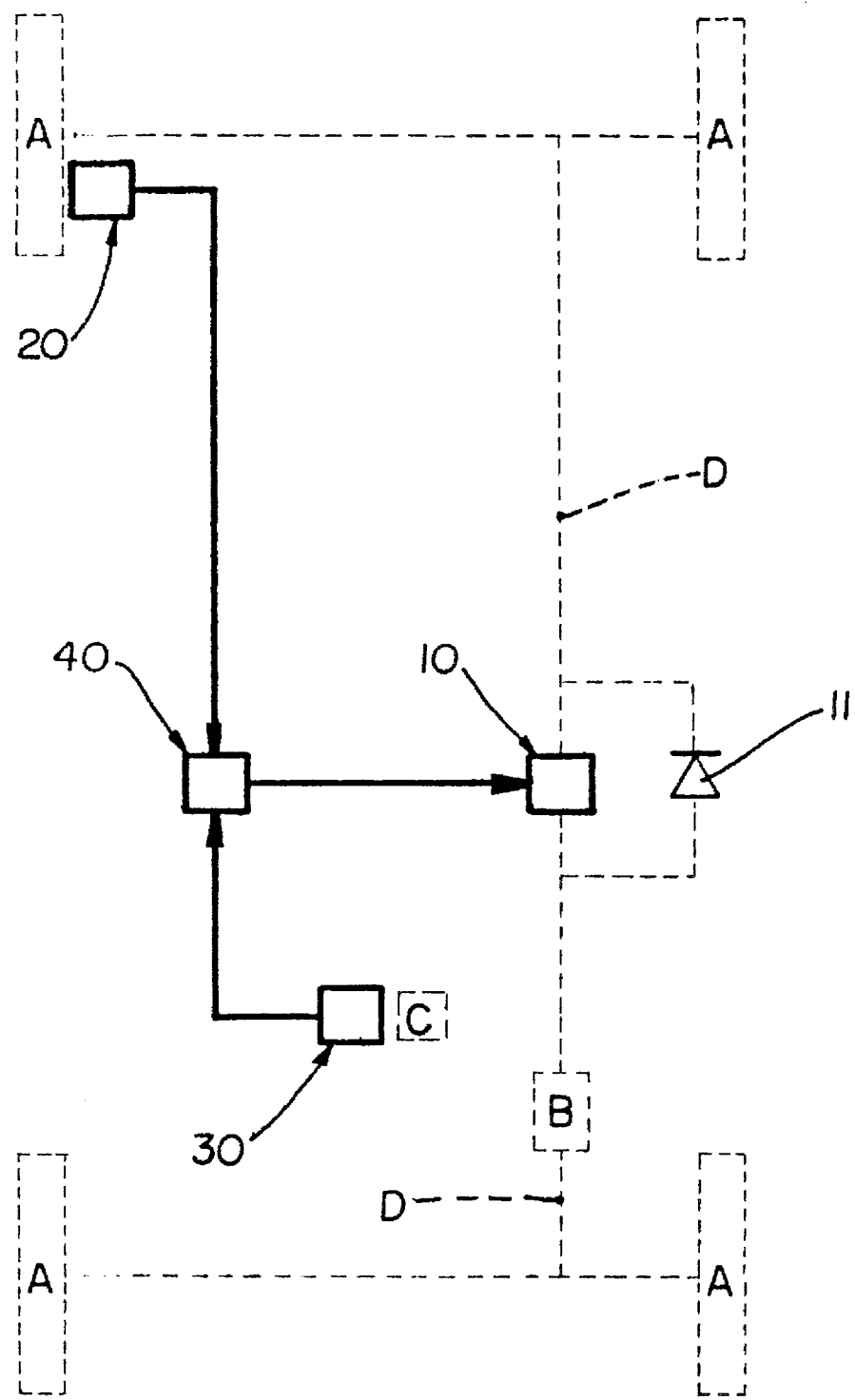

A road vehicle incorporating a brake system constructed according to the present invention is schematically illustrated in FIG. 1, the road vehicle having four wheels A, a brake control B and a gear shift lever C, the brake control B being defined by a master cylinder, in the case of hydraulic brakes, or a control valve, in the case of air brakes.

The braking elements of the wheels are connected in the well known manner, schematically represented by dotted lines D, with fluid being supplied by the control valve or master cylinder B, which can be operated by a vacuum servo unit (not shown).

According to the invention, the control device comprises, as schematically illustrated in FIG. 1, a brake control valve 10, a load sensor assembly 20, which is mounted to at least one wheel of the vehicle, an optional direction load sensor assembly 30 and a control unit 40. Of course, more than one control valves can be provided if necessary to keep all wheels of the vehicle under the control of the device, in the case of independent brake systems.

The brake control valve 10 is an electromechanical device, in the form of a solenoid valve, normally open, with a one-way valve 11 mounted in parallel to the brake control valve 10 in the case of a hydraulic brake system. In the case of air brakes, the control valve 10 is positioned in the air outlet of the braking system in order to selectively block the release of air and consequently the brake. The solenoid valve 10, controlled by the control unit 40, blocks or allows the passage of the hydraulic fluid to the wheel braking elements. The one-way valve 11 always allows the passage of the fluid, even with the solenoid valve closed, when the brake pedal (not shown) is pressed to increase the braking force, but does not permit the passage of the hydraulic fluid in the opposite direction. The solenoid valve 10 is of the normally open type, so that, in the case of control device failure, the car will not be immobilized.

The load sensor assembly 20 basically comprises a load sensor 21, mounted in an appropriate manner to avoid being overloaded, a voltage comparator and a signal amplifier 25. The load sensor 21 detects, by the load applied thereon, the elastic deformation of a sensor carrier member 22, in the form of an elongated blade, on which is applied the parking torque of the wheel braking elements, when the brake system is actuated, as it occurs, for example, when the vehicle is stopped on a hill. The elastic deformation of the sensor carrier member 22 is caused by two forces: one resulting from the slope of the hill that tends to move the vehicle downhill, and the other, in the opposite direction, by the brakes blocking that movement. The first force is the component of the gravity acting on the wheel axes. The second force acts on the region of the supporting structure of the brake pads. As these two forces are applied in different locations and in opposite directions, they form a binary system of forces and provoke the elastic deformation mentioned above.

According to the invention, the load sensor 21 is defined by a strain gage, adequately mounted on a load sensor carrier member 22, which is fixedly connected, at one end, to a sliding element 23, mounted to the wheel braking elements and, at the opposite end, to an adjacent portion of the brake supporting structure, such as the brake back plate of a drum brake arrangement.

The sliding element 23 is guided by the brake supporting structure and connected to the wheel braking elements, in order to be slightly moved between two operative end positions, defined by a pair of stops fixed to the brake supporting structure, when the actuated wheel braking elements are applying a certain braking torque to the wheel.

Figure 3:
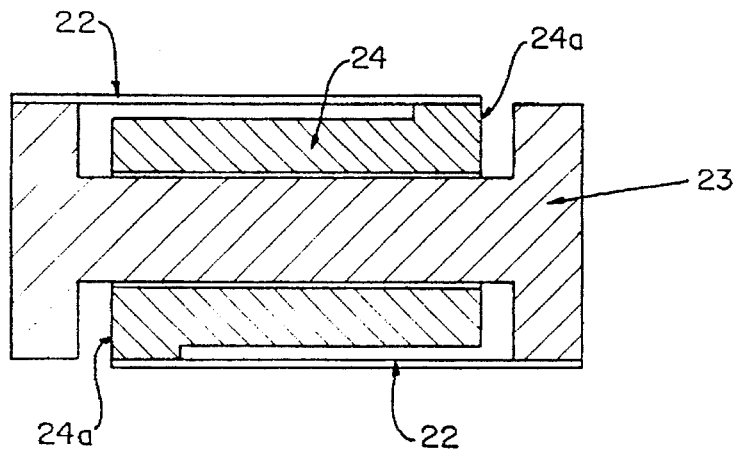
FIG. 3 is a longitudinal sectional view of one possible construction for the mechanical elements of the load sensor assembly.

According to the embodiment shown in FIG. 3, the sliding element 23 is defined by a rod, which slides axially in the interior of a guide 24, in the form of a tubular sleeve, fixed to the brake supporting structure, the ends of the rod having enlarged heads, which have the adjacent ends of the tubular guide 24 as the stops for limiting the axial displacement of the sliding element.

The sliding element 23 is made up of two halves to facilitate its mounting into the tubular guide 24. In the embodiment shown in FIG. 3, the tubular guide 24 has, near each end, an external projection 24a, fixing an end of a respective load sensor carrier member 22, having its opposite end fixed to the distal enlarged head of the sliding element 23.

The two load sensor carrier members 22 act as springs and suffer elastic deformation when the sliding element 23 is moved to the right or left, by the wheel braking elements, in relation to the tubular guide 24.

To avoid bucking of the load sensor carrier members 22 when compressed, they are pre-stretched when mounted to the sliding element and to the tubular guide 24, so that they will never reach a zero load during use. Depending on the location on which the load sensor assembly is installed, it is possible to use only one load sensor carrier member 22, pre-stretching it when the assembly is installed in the vehicle. If the device is projected to work in only one direction of movement, the load sensor carrier member 22 needs not be prestretched, independently of the location of the installation of the load sensor assembly 20. The strain gage is appropriately mounted on the respective load sensor carrier member 22 so that, as the load sensor carrier member is elastically deformed, the strain gage 21 is deformed as well, modifying its electrical resistance. The strain gage 21 forms part of an electronic circuit, the output voltage of which is proportional to the deformation of the strain gage 21. A Wheatstone Bridge, for example, could be used for this circuit.

Figure 4:
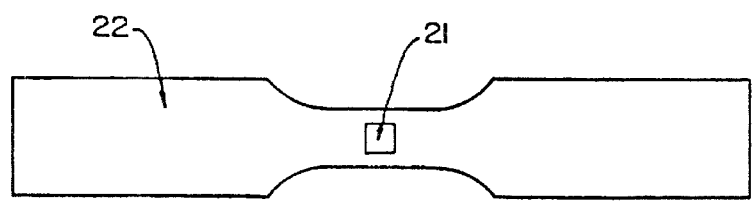
FIG. 4 is a plan view of one embodiment for the load sensor carrier member.

The total permitted movement of the sliding element 23 in relation to the tubular guide 24 is kept sufficiently small to avoid the rupture or plastic (permanent) deformation of the load sensor carrier members 22, but sufficiently large to provoke a significant variation in the electrical resistance of the respective strain gage 21. If a high sensibility is desired for small movements, the length of the load sensor carrier members 22 may be reduced or made with a variable cross section to concentrate the deformation in the region where the strain gage 21 is mounted. FIG. 4 shows one of the possible designs for the load sensor carrier members 22 to concentrate the elastic deformations in the region where the strain gage 21 is mounted.

Figure 5:
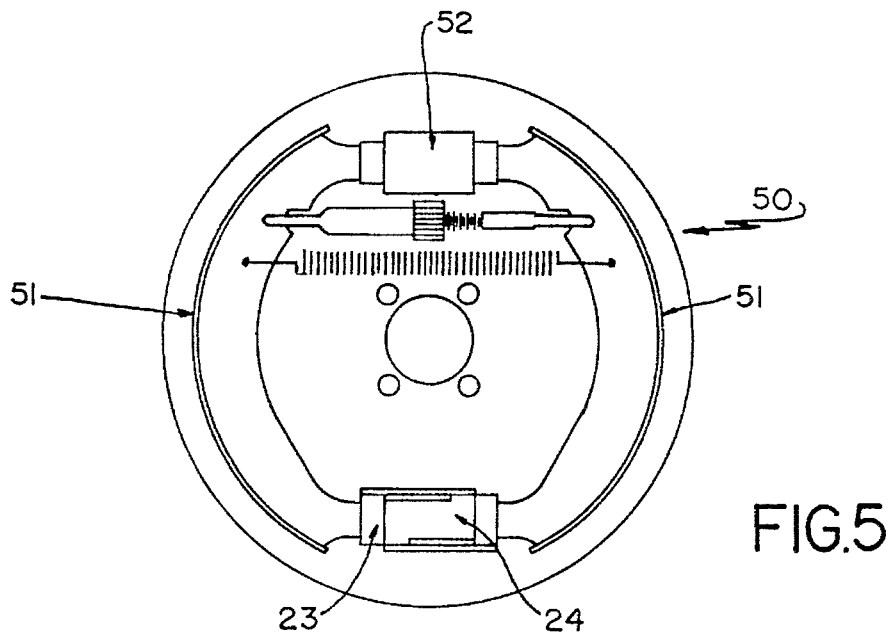
FIG. 5 is a front view of a drum brake assembly, including the mechanical elements of the load sensor assembly illustrated in FIG. 3.

Another strain gage (not shown) may be mounted on another load sensor carrier member 22, in order to compensate for the variations in the length of the load sensor carrier member 22 caused by temperature variations and connected to the Wheatstone Bridge, as is commonly done for temperature compensations. With this configuration, variations in the length of the load sensor carrier members 22, in the same direction will not result in a change of the output voltage, but variations in opposite directions will intensify the changes in voltage. It should be noted that, due to the manner by which load sensor assembly 20 is mounted, the load sensor carrier members 22 will vary in length in the same direction with temperature changes, but in opposite directions when subjected to a braking torque. This compensation may also be achieved by mounting the second strain gage 21, transversely to the first one on the same load sensor carrier member 22. This is possible because the temperature variations cause a variation in the same direction (expansion or contraction) in the length and width of the blades which define the illustrated pair of load sensor carrier members 22, while the application of braking torque on said blades causes a variation in their length in one way and in their width in the opposite way. It is also possible to mount more than one strain gage 21 on each of the load sensor carrier members 22, to give the load sensor assembly 20 more sensitivity. FIG. 5 shows one of the possible ways to install the load sensor assembly 20 on drum brakes. The tubular guide 24 is mounted on the brake back plate 50, with the brake shoes 51 respectively supported by the ends of the sliding element 23. While braking, the brake shoes 51 are pressed against the brake drum (not shown) by their actuator 52. The friction between the brake shoes 51 and the brake drum generates one of the forces of the binary system mentioned above. The other force component of the binary system is caused by the slope of the hill and is transmitted to the fixing point of the brake back plate 50. The binary system of forces produces a tendency of the brake shoes 51 to rotate in relation to the brake plate 50. This force is transmitted to the load sensor carrier members 22 by the sliding element 23 and results in the elastic deformation of the load sensor carrier members 22 and consequently of the respective strain gages 21.

Figure 6:
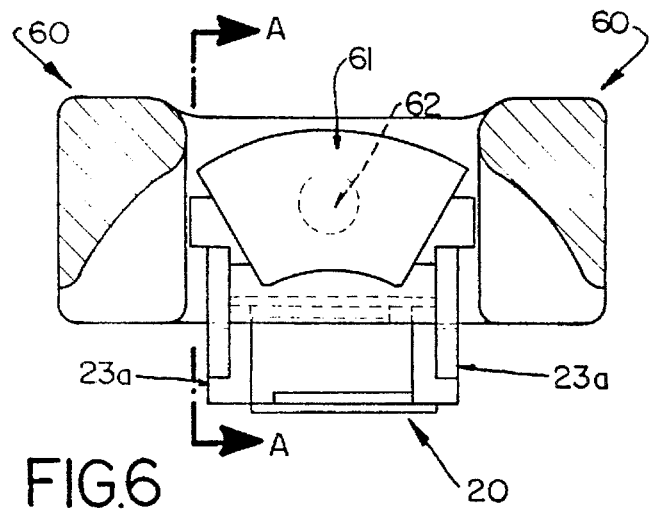
FIG. 6 is a cross sectional view of a disk brake assembly, taken along the line VI—VI of FIG. 6A.
Figure 6A:
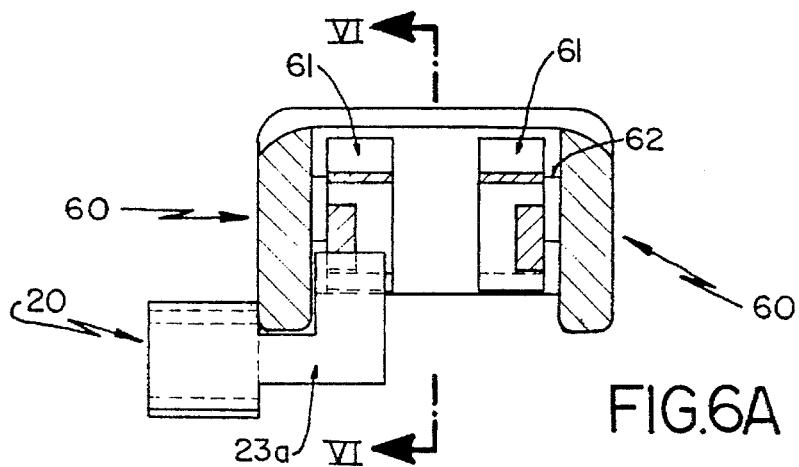
FIG. 6A is a diametrical cross sectional view, taken along the line A—A, of the disk brake assembly of FIG. 6.

FIGS. 6 and 6A show one of the possible ways to install the load sensor assembly 20 on a disk brake system. The tubular guide 24 is mounted to the brake pincer 60, with the brake pads 61 respectively supported by the ends of the sliding element 23 via the braces 23a. While braking, the brake pads 61 are pressed against the brake disk (not shown) by their actuator cylinders 62. The friction between the brake pads 61 and the brake disk generates one of the forces of the binary system mentioned earlier. The other force component of the binary system is caused by the slope of the hill and is transmitted to the fixing points of the piece that holds the brake pincer 60. The binary system of forces produces a tendency of the brake pads 61 to move in relation to the brake pincer 60. This force is transmitted by the braces 23a to the sliding element 23 and results in the elastic deformation of the load sensor carrier menders 22 and consequently of the respective strain gages 21.

Figure 7:
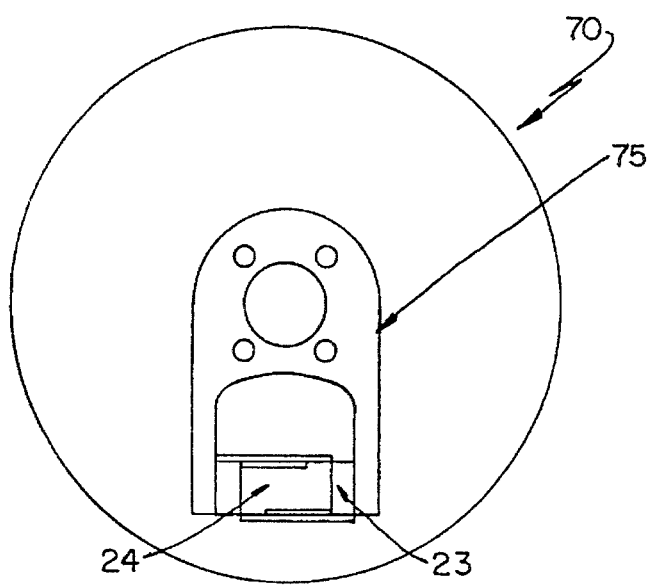
FIG. 7 is a front view of another possible arrangement for mounting the mechanical elements of the load sensor assembly on the supporting structure of the wheel braking elements.

FIG. 7 shows another possible form of installation of the load sensor assembly 20. The tubular guide 24 is attached to the brake supporting structure 70, which can be the brake back plate 50, in the case of drum brakes, or the piece that holds the brake pincer 60, in the case of disk brakes. The ends of the sliding element 23 are attached to the piece 75, which is mounted, for example, on the same fixing points of the brake supporting structure 70. The binary system of forces, created while braking, forces the brake supporting structure 70 to move in relation to the piece 75. The relative movement between said two parts 70 and 75 will move the sliding element 23 in one direction, causing an elastic deformation of the load sensor carrier members 22 and of the respective strain gages 21. In this construction, the provision of a second load sensor carrier member is not necessary and the one load sensor carrier member 22 is pre-stretched between the brake supporting structure 70 and the piece 75, when the load sensor assembly is installed.

In order to amplify the signal generated by the Wheatstone Bridge, an electronic circuit based on an operational amplifier 25, for example, could be used. This circuit would be adjusted to give an output voltage from the amplifier 25, different from the limits of the power supply, when the load sensor 21 (strain gage) is at rest. Consequently, the output of the operational amplifier 25 would be at one voltage when the strain gage 21 is at rest, at a higher voltage when the strain gage 21 is compressed and at a lower voltage when the strain gage 21 is under traction.

The signal (voltage variations) produced by this load sensor 21 is sent to the control unit 40, informing the moment when the load sensor 21 is unloaded or loaded in the opposite direction. This is the moment in which the driving torque from the vehicle engine is equal to or greater than the braking torque produced by the slope of the hill.

Figure 2:
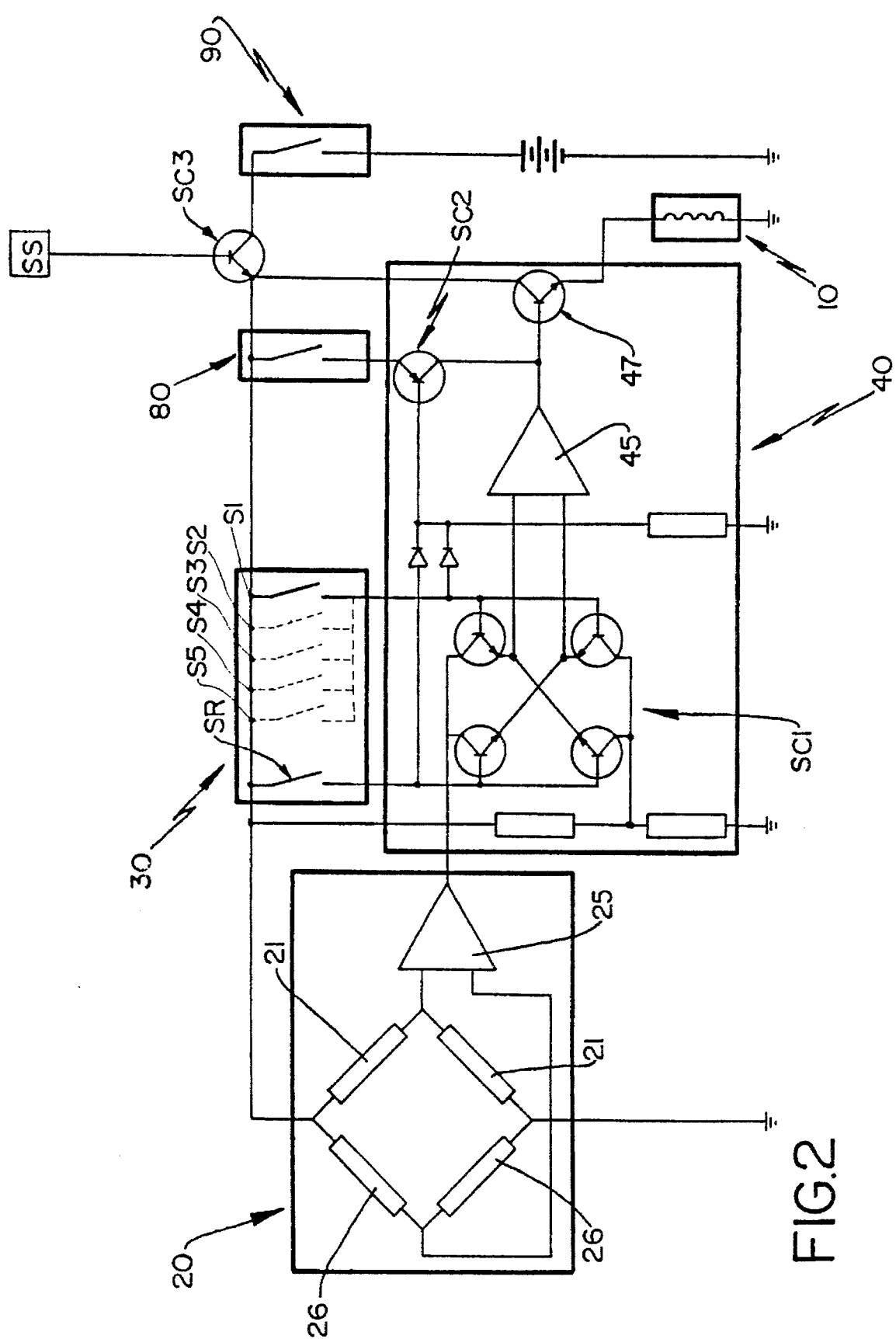
FIG. 2 illustrates, in a simplified and schematic manner, a possible electronic circuit to be used in the control device of the present invention.

In FIG. 2, the direction sensor 30 is a device that activates the control unit 40, informing it whether the vehicle is in a forward, reverse or neutral gear. It should be noted that the provision of the direction sensor 30 is necessary only when the control device is designed to operate in both directions, that is, uphill and downhill. When the vehicle is in a forward gear, the brakes will not be released while there is a tendency for the vehicle to go backwards. When the reverse gear is engaged, the brakes will not be released while there is a tendency for the car to go forward. While the vehicle is in the neutral gear, the brakes will be released, allowing the vehicle to go in any direction. This sensor consists of a switch with three positions, where one position (corresponding to neutral gear) suppresses the voltage output of the control unit 40, disconnecting the solenoid valve of the brake control valve 10, or maintaining it closed for both directions, depending on the configuration adopted. This sensor is made up of a series of switches S1, S2, S3, S4, S5 and SR, one of which is "on" when the reverse gear is engaged, while any one of the other switches is "on" when a forward gear is engaged. This creates three possible situations: the reverse gear switch SR is "on" and the forward gear switch(es) is (are) "off"; the reverse gear switch is "off" and a forward gear switch is "on"; all of the switches are "off". It is possible to adopt a configuration in which, in the neutral gear, the system will act in both directions of movement using a simple circuit SC2. For example, a transistor of the PNP type in the control unit 40 could be switched on when all of the switches are "off". In this case, a second on-off switch 80 could be used to choose one or the other of the configurations. The on-off switch 80 allows the driver to select the operation mode, imparting or not the hill hold capability to the brake system, when the gear shift lever is at the neutral position.

In the construction in which the brake system, while in the neutral condition of the gear shift lever, acts in both directions of movement, it is necessary to install in the direction sensor 30 a switch for every position of the gear shift lever that indicates a forward gear, all said switches being parallel to each other. This is necessary to insure that there is always a switch "on" when a forward gear is engaged and that the control unit 40 will not show a false condition of neutral gear, characterized by the lack of any switch "on". If the vehicle has an anti-blocking system (ABS), the information from the wheel speed sensor SS could be used to permit the activation of the control device, through switching means SC3, only when the vehicle is stopped, thus requiring switches only for those gears used to move the vehicle from a stopped condition. This information could be used for the other configuration as well, facilitating the practice of driving the vehicle during small maneuvers on hills.

The control unit 40 is an electronic device that processes the information of the direction sensor 30 and the load sensor assembly 20, activating the solenoid of the brake control valve 10.

The control unit 40 closes the solenoid of the brake control valve 10 only when the voltage coming from the load sensor assembly 20 is different from the value that said assembly supplies when under no load. When the voltage is different from the unload value and an appropriate gear is engaged, the flow of fluid through the brake control valve 10 will be blocked. In the configuration where neutral gear condition blocks the movement of title vehicle in both directions, the solenoid of the brake control valve 10 will remain closed while the gear shift lever is in the neutral position.

The functions of the control unit 40 could be performed, for example, with an electronic circuit based on an operational amplifier 45, designed to compare the voltage coming from the load sensor assembly 20 with a fixed reference voltage, that is the same as the voltage produced by the load sensor assembly 20 when the load sensor 21 is at rest. The direction sensor 30 will determine if the solenoid of the brake control valve 10 should be closed when the voltage is above or below the reference voltage. To achieve this, the direction sensor 30 supplies the voltage coming from the load sensor assembly 20 to one of the inlets of the operational amplifier 45 and the reference voltage to the other inlet, when the gear shift lever is positioned to move the vehicle in one direction, and will supply the voltages the other way around when the gear shift lever is positioned to move the vehicle in the opposite direction. This is obtained by first switching means SC1 of the control unit 40, said first switching means SC1 selectively connecting the outlet of first amplifier means 25 to the first and second inlets of the second voltage comparator means, while applies the reference voltage to the other of said first and second inlets. The difference between the two voltages is amplified, causing the flow of current to close the solenoid of the brake control valve 10, maintaining the vehicle braked even when the brake pedal is released. When the driving torque from the engine is equal to or greater than the opposite braking torque caused by the slope of the hill, the load sensor 21 is unloaded, or loaded in the opposite direction. When this happens, the difference between the two voltages becomes zero or negative, causing the opening of the solenoid of the brake control valve 10, liberating the flow of the fluid. With the gear shift lever in the neutral position, no voltage is applied to the operational amplifier 45 of the control unit 40, which results in the freedom of the vehicle to move in any direction. However, configured to block the movement of the vehicle in any direction while in the neutral gear condition, the circuit added for this purpose (commented in the description of the direction sensor 30) supplies voltage directly to the solenoid of the brake control valve 10, avoiding the vehicle from moving in any direction. In this case, the on-off switch 80 can be used to make the device act in one configuration or the other, depending on the position of this switch being "on" or "off".

The device covered by this invention will act when the vehicle is stopped on a hill and simultaneously the brake pedal is pressed and an appropriate gear engaged (a forward gear when going up a hill in a forward direction, or a reverse gear when going up a hill backwards or in neutral gear, depending on the chosen configuration). In these cases, the direction sensor 30 is activated simultaneously with the loading of the load sensor 21, said loading being due to the fact that the vehicle tends to move down the hill against the braking torque of the brakes.

The loading of the load sensor 21 causes a variation in the voltage of the input to the control unit 40 which, depending on the information received by the direction sensor 30, creates a voltage output of the control unit 40 sufficient to close the solenoid of the brake control valve 10 blocking the flow of the brake fluid. This maintains the vehicle braked, even when the pressure on the brake pedal is removed. When the vehicle tries to move uphill, the load sensor is progressively unloaded, until it reaches its rest state. At this moment, the voltage generated by the load sensor assembly 20 will be equal to the reference voltage of the control unit 40. This cuts the voltage output of the control unit 40, opening the solenoid of the brake control valve 10, and permits the passage of the fluid, releasing the brakes of the vehicle.

Once the system is activated, it is necessary to put the car into neutral, or into a gear in the downhill direction, in order to let the vehicle go downhill. When this happens, the voltage input to the operational amplifier 45 of the control unit 40 will be cut, or the reference voltage and that voltage from the load sensor assembly 20 will be inverted, to the inlets of the operational amplifier 45 of the control unit 40. This results in a lack of output voltage of the control unit 40 and the opening of the solenoid of the brake control valve 10, allowing the passage of the fluid and the movement of the vehicle. If the device is configured to block the movement of the vehicle in any direction, while in neutral, the voltage on the solenoid of the brake control valve 10 will not be cut, while in neutral, making it necessary to engage a gear in the downhill direction, in order to open the solenoid of the brake control valve 10.

The existence of the direction sensor 30 makes the device act only when the load sensor 21 is adequately loaded, i.e., when the brakes inhibit the movement of the car in the opposite direction of the gear engaged. Thus, when the car is moving in the same direction as the gear engaged, the device will not have any effect, as the load sensor 21 is loaded in the opposite direction of that required to activate the device.

To avoid that the device remains connected while the vehicle is parked, the power supply of the circuit passes through the ignition key switch 90 of the vehicle.

This invention does not alter the normal habits of driving, nor introduces significant modifications to the braking system of the vehicle. It only adds a function that permits the execution of the maneuvers mentioned above with convenience and security.

We claim:

1. A device for the automatic control of a vehicular brake system on hills, comprising:

an electromechanical control valve, mounted to the brake system, in order to selectively allow and block the release of a braking fluid pressure applied to the wheel braking elements;

at least one load sensor operatively connected to the wheel braking elements in order to be elastically deformed in two opposite directions from a rest condition when the wheel braking elements are applying to a wheel a braking torque lower than a certain minimum value and between two opposite end deformed conditions and when the wheel braking elements are applying to said wheel a braking torque at least equal to said minimum value, said load sensor varying its electrical resistance upon said elastic deformation;

first voltage comparator means, having a first and a second inlet connected to an electrical power source of the vehicle, at least one of said inlets being connected to the electrical power source through at least one load sensor, said first voltage comparator means having an outlet delivering a predetermined output voltage when the load sensor is in the rest condition and a different output voltage when the load sensor is elastically deformed towards any of its opposite end deformed conditions;

first amplifier means connected to the outlet of the first voltage comparator means in order to amplify the output voltage therefrom;

a control unit receiving the amplified output voltage from the first amplifier means and a reference voltage from the electrical power source, said reference voltage being equal to said predetermined amplified output voltage from first amplifier means, said control unit having: second voltage comparator means provided with a first inlet, a second inlet and an outlet which can deliver an output voltage when the voltage applied in the first inlet of said second voltage comparator means is greater than the voltage applied to the second inlet of said second voltage comparator mean and first switching means (SC1) to selectively apply the output voltage from the first amplifier means to the first and second inlets of the second voltage comparator means, while applying the reference voltage to another of said first and second inlets of the second voltage comparator means;

a direction sensor assembly having switches (S1, S2, S3, S4, S5, SR) each one being associated with a respective gear shift lever position defined at least by the forward and rear gear positions and connecting the electrical power source to the first switching means (SC1) of the control unit when the respective gear is engaged, said connection of the first switching means (SC1) with the electrical power source defining the inlet of the second comparator means to which the output voltage of the first amplifier means is to be applied, in order to provide the output voltage from the second voltage comparator means when the wheel braking elements are applying said minimum braking torque to the wheel in a direction opposite to the direction of driving torque and of the gear selected by the gear shift lever;

second amplifier means having an inlet connected to the outlet of the second voltage comparator means and an outlet connected to the electromechanical control valve in order to amplify the output voltage of the second voltage comparator means to a value sufficient to close said control valve.

2. Device, according to claim 1, said control unit further comprising second switching means (SC2) selectively connecting the electrical power source to the electromechanical control valve when the gear shift lever is at a neutral gear position, in order to close said control valve independently of the values and directions of the braking torque and the driving torque applied to said vehicle wheel.

3. Device, according to claim 2, wherein the second switching means (SC2) is connected to the electrical power source through an on-off switch to be selectively actuated by the vehicle driver.

4. Device, according to claim 2, wherein the second switching means (SC2) is connected to the switches (S1, S2, S3, S4, S5, SR) of the direction sensor assembly, in order to energize the control valve when the gear shift lever is at the neutral gear position.

5. Device, according to claim 4, wherein the second switching means (SC2) comprises a transistor which is in a conducting condition when the direction sensor assembly is not connecting the first switching means (SC1) to the electrical power source.

6. Device, according to claim 1, wherein a second switching means (SC2) is connected to the inlet of second amplifier means.

7. Device, according to claim 1, wherein the device is connected to the electrical power source through third switching means (SC3) actuated by wheel speed sensor means (SS) in order to deenergize the device when at least one wheel is rotating.

8. Device, according to claim 1, wherein the electromechanical control valve selectively allows and blocks the passage of a hydraulic braking fluid between an actuator cylinder of the wheel braking elements and a master cylinder (B) of the vehicle.

9. Device according to claim 8, further comprising a one-way valve mounted in parallel to the control valve in order to always allow the flow of hydraulic braking fluid from the vehicle master cylinder (B) to the actuator cylinder.

10. Device, according to claim 1, wherein the load sensor is mounted on a respective sensor carrier member, connecting the wheel braking elements to a brake supporting structure, in order to be elastically deformed when the braking torque applied on said wheel reaches said minimum value.

11. Device, according to claim 10, wherein the sensor carrier member is connected to the wheel braking elements through a sliding element guided on the brake supporting structure in order to be displaced from a rest position when the wheel braking elements are applying a braking torque lower than said minimum value and between two opposite end positions when the applied braking torque presents at least said minimum value.

12. Device, according to claim 11, wherein the sliding element slides inside a guide fixed to the braking supporting structure and presenting opposed ends which define stops for the sliding element in its two opposite end positions.

13. Device, according to claim 12, wherein the sliding element is defined by a rod and the guide takes the form of a tubular sleeve, the ends of the rod projecting outwardly from the respective ends of the tubular guide and being connected to the wheel braking elements.

14. Device, according to claim 13, wherein the sliding element has its ends provided with enlarged heads which are seated against the adjacent end of the tubular guide when the sliding element is moved to one of the respective opposite end positions.

15. Device, according to claim 13, wherein the ends of the sliding element are directly and respectively connected to the non-actuated ends of the braking elements of the wheel provided with a drum brake.

16. Device, according to claim 13, wherein the ends of the sliding element supports at least one of the brake pads of the wheel provided with a disk brake.

17. Device, according to claim 13, wherein at least one end of the sliding element fixes an end portion of said respective sensor carrier member.

18. Device, according to claim 17, wherein the end portion of said sensor carrier member, opposite to that one fixed to the sliding element, is fixed to a distal point of the tubular guide.

19. Device, according to claim 17, wherein the load sensor carrier member comprises an elongated blade carrying at least one load sensor.

20. Device, according to claim 11, wherein the sliding element is connected to the brake supporting structure by two load sensor carrier members disposed in order that one of said sensor carrier members is elastically deformed in one direction while the other is elastically deformed in an opposite direction when the braking elements are applying braking torque to said wheel in any running direction of the vehicle.

21. Device, according to claim 11, wherein the sensor carrier member is mounted in order to be more and less elastically deformed, without reaching a zero load condition, when the sliding element is moved between its two opposite end positions.

22. A device for the automatic control of a vehicular brake system on hills, comprising:

an electromechanical control valve, mounted to the brake system, in order to selectively allow and block the release of the braking fluid pressure applied to the wheel braking elements;

at least one load sensor operatively connected to the wheel braking elements in order to be elastically deformed in two opposite directions from a rest condition when the wheel braking elements are applying to a wheel a braking torque lower than a certain minimum value and between two opposite end deformed conditions and when the wheel braking elements are applying to said wheel a braking torque at least equal to said minimum value, said load sensor varying its electrical resistance upon said elastic deformation;

voltage comparator means, having a first and a second inlet connected to an electrical power supply of the vehicle, at least one of said inlets being connected to the electrical power source through at least one load sensor, said voltage comparator means having an outlet, delivering electrical signals representing a positive voltage variation said voltage variation being zero, when the load sensor is in a rest condition and values different from zero when the load sensor is deformed by an elastic deformation of a sensor carrier member; and amplifier means connected to the outlet of the voltage comparator means in order to amplify the positive voltage variation to a value sufficient to conduct the electromechanical control valve to a closed condition, when the wheel braking elements are applying said certain minimum braking torque to the wheel.

23. Device, according to claim 22, wherein the load sensor is mounted in order to produce a positive voltage variation at the outlet of the voltage comparator means when the braking torque, which is being applied by the wheel braking elements, is sufficient to avoid the vehicle moving backwardly, downhill.

24. Device, according to claim 23, wherein there is provided a by-pass circuit comprising an on-off switch, connecting the electrical power supply to the electromechanical control valve in order to allow its selective energization by the vehicle driver, independently from the electrical signal delivered from the amplifier means.

25. Device, according to claim 22, wherein the load sensor is mounted on said respective load sensor carrier member, connecting the wheel braking elements to a brake supporting structure, in order to be elastically deformed when the braking torque applied on said wheel reaches said minimum value.

26. Device, according to claim 25, wherein the load sensor carrier member is connected to the wheel braking elements through a sliding element guided on the brake supporting structure in order to be displaced from a rest position when the wheel braking elements are applying a braking torque lower than said minimum value and between two opposite end positions when the applied braking torque presents at least said minimum value.

* * * * *